United States Patent [19]

Wiers

[11] Patent Number: 4,552,405
[45] Date of Patent: Nov. 12, 1985

[54] SUPPORT FOR SEAT ADJUSTING DEVICE
[75] Inventor: John W. Wiers, Romeo, Mich.
[73] Assignee: Rockwell International Corporation, Pittsburgh, Pa.
[21] Appl. No.: 539,442
[22] Filed: Oct. 6, 1983
[51] Int. Cl.[4] .............................................. A47C 1/027
[52] U.S. Cl. ..................................... 297/375; 74/531; 188/67
[58] Field of Search .............. 297/374, 375, 353, 354, 297/355; 74/531; 188/67; 248/410

[56] References Cited

U.S. PATENT DOCUMENTS

| 3,271,071 | 9/1966 | Tabor | 297/375 |
|---|---|---|---|
| 3,334,931 | 8/1967 | Holt et al. | 248/410 |
| 3,828,893 | 8/1974 | Clark | 74/531 |
| 4,387,926 | 6/1983 | Van Eerden et al. | 297/375 |

FOREIGN PATENT DOCUMENTS

| 1136076 | 9/1962 | Fed. Rep. of Germany | 297/375 |
|---|---|---|---|
| 2820532 | 11/1979 | Fed. Rep. of Germany | 297/375 |

Primary Examiner—William E. Lyddane
Assistant Examiner—Mark W. Binder

[57] ABSTRACT

An automotive seat adjusting device which includes a rod slidably received within a plurality of lockwashers counted into locking engagement with the rod. The operative elements of the locking mechanism are enclosed within a housing and a hollow tubular steel fulcrum is supported by a pin projecting out of the housing and fixed to the seat frame.

7 Claims, 12 Drawing Figures

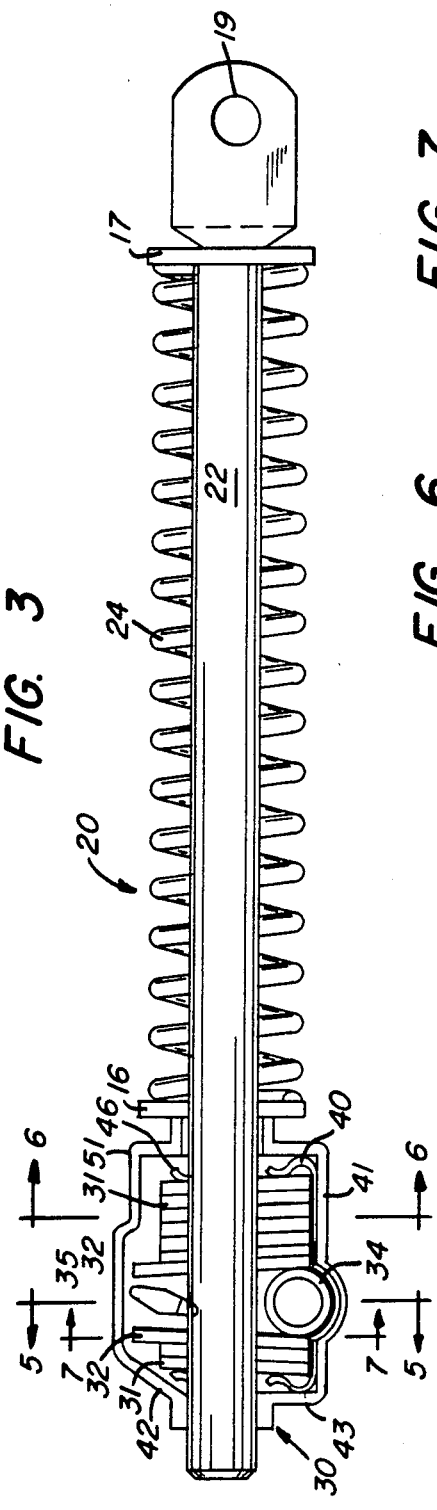

SUPPORT FOR SEAT ADJUSTING DEVICE

BACKGROUND OF THE INVENTION

1. Field of the Invention

The present invention relates to a seat adjusting device and more specifically, to a support for an automotive vehicle seat adjusting device of the type which includes a rod pivotally attached to the seat back and slidable for selective positioning within a locking mechanism fixed to the seat.

2. Description of the Prior Art

A seat adjusting devices of the type which the present invention is directed to generally include a shaft or rod slidably received within a locking mechanism which includes a plurality of lockwashers slidably mounted on the rod, a fulcrum and a spring or other means biasing the lockwashers about the fulcrum to engage the edge of the lockwasher apertures with the surface of the rod and thereby hold or "lock" the rod in that position relative to the locking mechanism and the seat to which it is fixed. A manually actuable release mechanism, is usually associated with the locking mechanism to move the lockwashers against the spring or other biasing force and thereby selectively position the rod and seat back relative to the locking mechanism and seat at which point the release mechanism is deactuated thereby permitting the spring or other biasing means to cant the lockwashers into engagement with the rod and thereby hold the selected position. The release mechanism is frequently provided in the form of a rotary or pivoting cam actuated by means of a crank lever or a handle.

Automotive vehicle seat adusting devices of the type to which the present invention is directed are disclosed in U.S. Pat. Nos. 3,271,071 and 4,387,926. Those patents disclose a seat adjusting device comprising a rod slidably received by a locking mechanism enclosed within a stamped or tubular metal housing. Those seat adjusting devices are secured for pivotal movement relative to the seat elements by means of an aperture provided at one end of a rod and an aperture provided to the metal housing at the opposite end of the seat adjusting device. With such an arrangement, the forces developed between the lockwashers and the rod internally of the locking mechanism must be absorbed by the housing or transmitted by the housing through the element pivotally fixing the apertured end of the housing to one of the seat elements. Those seat adjusting devices also utilize coil springs internally of the housing to bias the lockwashers into engagement with the rod. The coil springs require a seat or other means opposite the lockwashers and guiding means such as the rod or other projections provided internally of the locking mechanism housing which constitute additional elements and require a more tedious and complex assembly of the seat adjusting device.

SUMMARY OF THE INVENTION

The present invention provides an automotive vehicle seat adjusting device including a rod secured to one part of the seat and axially movable relative to a locking mechanism for selectively locking engagement at different positions on the rod. The locking mechanism includes a fulcrum having an axis normal to the access of the rod, a plurality of lockwashers slidably mounted on the rod with at least one washer on each side of the fulcrum, means biasing the washers about the fulcrum to engage the rod and manually actuable means for moving the lockwashers against the biasing force to release that engagement. A housing substantially enclosing the lockwashers, fulcrum, biasing means and the means for moving the lockwashers against the biasing force and a fulcrum support projecting out of the housing and fixed to another part of the seat are also provided to transfer the load applied to the lockwashers and the fulcrum directly to the other part of the seat independently of the housing.

In the preferred embodiment, the fulcrum is provided in the form of a hollow tubular member, the housing is supported by a pair of axially aligned apertures seated at each end of the hollow tubular member and the fulcrum support is a pin slidably received interiorly of the hollow tubular member.

The advantages offered by the present invention will become apparent from the following description of the embodiment shown in the accompanying drawings.

DESCRIPTION OF THE DRAWINGS

In the drawings, when like reference numerals refer to like parts:

FIG. 2 is a plan view of the seat adjusting device shown in FIG. 1;

FIG. 3 is a sectional view taken along the line 3—3 of FIG. 2;

FIG. 6 is a sectional view taken along line 6—6 of FIG. 3;

FIG. 7 is a sectional view taken along line 7—7 of FIG. 3;

DESCRIPTION OF THE INVENTION

Figure 1:
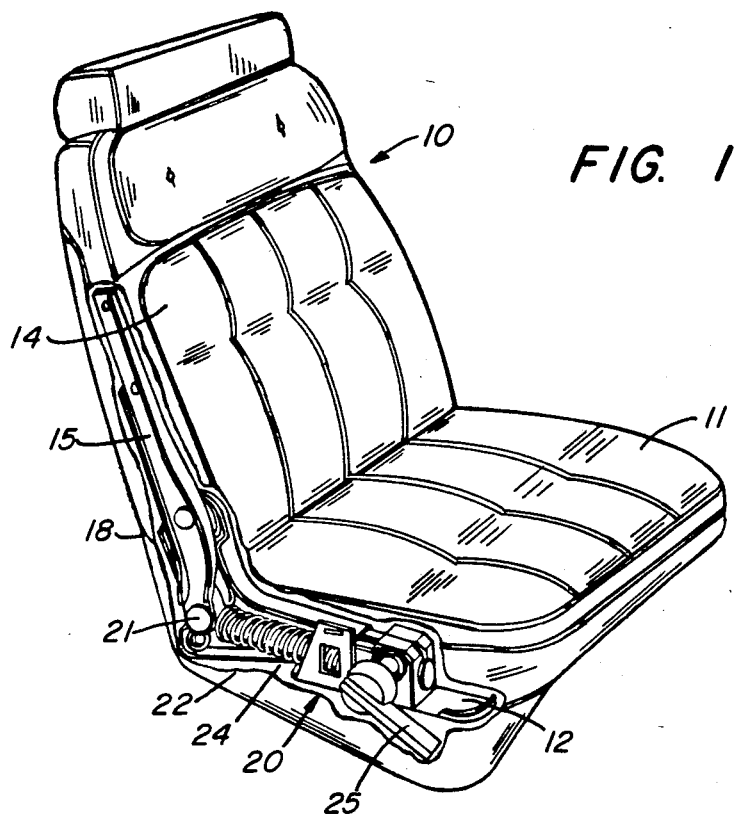
FIG. 1 is a perspective view of an automotive vehicle seat which includes the seat adjusting device of the present invention.
Figure 4:
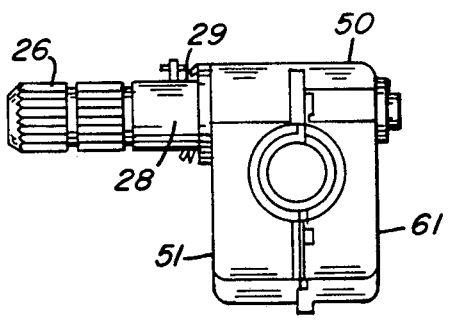
FIG. 4 is a front elevation view of the seat adjusting device shown in FIG. 1.

With reference to the drawings, FIG. 1 shows an automotive vehicle seat 10 comprised of a seat portion 11 supported by a frame a portion of the which is shown at 12 and a seat back 14 supported by a pair of side back frames one of which is shown at 15. A seat adjusting device 20 includes a locking mechanism secured to the seat frame 12 and a rod 22 slidably received within the locking mechanism is pivotally secured by means of a pin 21 at the lower end of the seat back frame 15. A seat return coil spring 24 is provided between the side frame 15 and the locking mehchanism to bias the side frame 15 and seat back 14 to the upright position. A manually actuated lever 25 is provided to release the locking mechanism threby permitting an occupant of the seat 10 to adjust the seat back 14 to a comfortable position by moving the lever 25 to release the locking mechanism and moving the seat back 14 which in turn will move the side frame and rod 22 relative to the locking mechanism at which time the occupant will release the lever 25 thereby locking the rod 22 and seat back 14 in that selected position.

With reference to FIGS. 2 and 3 the lever 25 is seated on the splined end 26 of a shaft 28 rotatably mounted to the locking mechanism generally indicated by the reference numeral 30. A return spring 24 is seated at one end on the locking mechanism 30 and at the other end on a pin carried by the shaft 28 to return the lever 25 and shaft 28 to its inoperative position upon release. The seat return spring 24 coxially with rod 22 is seated at its opposite ends against washers 16 and 17. The washer 16 bears against the housing of locking mechanism 30 to move the rod 22 to its fully extended position as shown in FIGS. 1–3. The end of the rod adjacent washer 17 is provided with an aperture 19 for receiving the pin 21 which pivotally connects the rod 22 to the lower end of the seat back frame 15 which in turn is pivoted for rocking movement about a pin 18.

The locking mechanism includes a plurality of lockwashers 31 and 32, a fulcrum in the form of a hollow steel tube 34, a formed spring 40 and a cam 35 enclosed within a housing 50.

The lockwashers 31 and 32 are apertured with the diameter of the aperture being slightly larger than the diameter of the rod 22 so as to enable the washers to be tilted or canted about the fulcrum tube 32 with an edge of each aperture engaging the surface of the rod 22 with the net effect of the edges of the apertures of all of the lockwashers 31 and 32 preventing relative movement between the rod 22 and the assembly of lockwashers 31 and 32.

Figure 12:
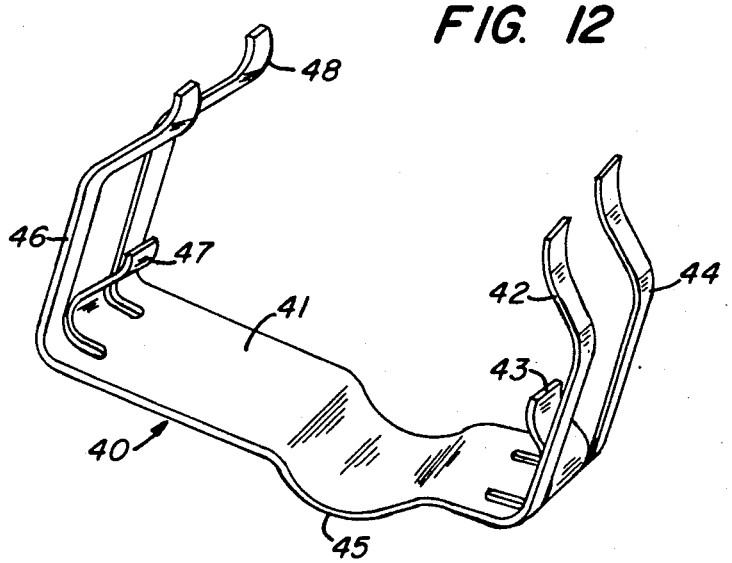
FIG. 12 is a perspective view of the lockwasher biasing spring.

The lockwashers are tilted or canted into engagement with rod 22 by the spring 40 which, as shown by FIGS. 3 and 12 is a formed spring of generally "C" or channel shape having a web portion 41 and a plurality of legs 42–44 and 46–48 at each end of the web. The web 41 is of sufficient width to extend across the combined thickness of the lockwashers 31 and 32 and is formed with a cylindrical depression 45 which is seated across the bottom of the tubular fulcrum 34 as shown by FIG. 3. The legs 42, 44 and 46, 48 are spaced so they may extend parallel to the opposite side walls of the housing 50, one on each side of the rod 22 where the legs 42, 44, 46 and 48 contact the lockwashers 31 which are most distant from the fulcrum 44 and cant those, as well as the intermediate lockwashers, into engagement with the rod 22. The spring leg 43 located between the legs 42 and 44 and the spring leg 47 located between the legs 46 and 48, although not as long as the legs 42, 44, 46 and 48 are nevertheless of sufficient length to extend beyond the axis of the tubular fulcrum 44 and add additional biasing force to urge the lockwashers about the fulcrum 34.

In addition to the locking operation provided by the biasing force of the spring 40, the spring 40 also maintains the stack of lockwashers 31 and 32, the tubular fulcrum 34 and itself as a unit subassembly on the rod 22 during assembly of the seat adjusting device 20.

Figure 5:
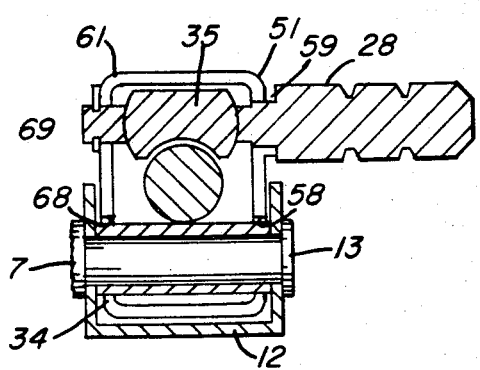
FIG. 5 is a sectional view taken on the line 5—5 of FIG. 3.

The cam 35 is integrally formed as part of the shaft 28, see FIG. 5, which is seated for rotation in axially aligned apertures 59 and 69 provided through the locking mechanism housing 50.

The lockwashers 31, 32 are elongate and substantially rectangular in form. As shown by FIGS. 6 and 7, the vertical dimension is greater than the width of the lockwashers 31, 32 and this facilitates a very compact locking mechanism that fits snugly upon the seat frame 12 at the side of the seat. The number and specific arrangement of the lockwashers required depends upon each particular application. In the preferred embodiment, two control lockwashers 32 are provided as the innermost lockwashers immediately adjacent the fulcrum 34. As shown by FIGS. 3, 6 and 7, the control lockwashers 32 are of greater length at the top of the locking mechanism than are the lockwashers 31 to present a slightly larger area facing the rotary cam 35.

Figure 8:
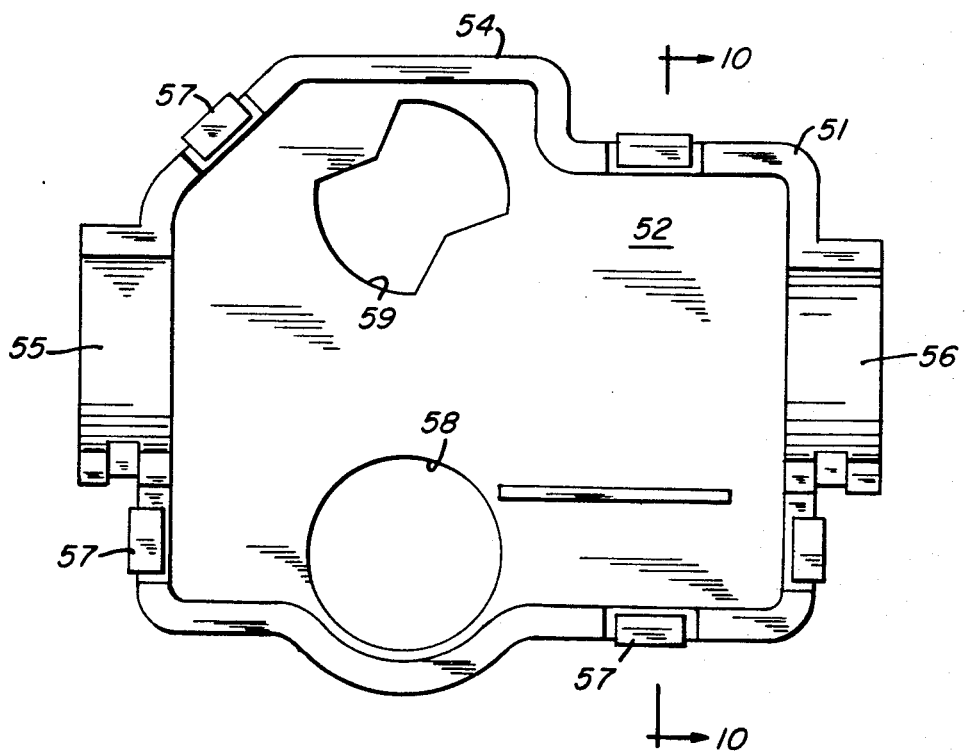
FIG. 8 is a side elevation view of one member of the locking mechanism housing.
Figure 10:
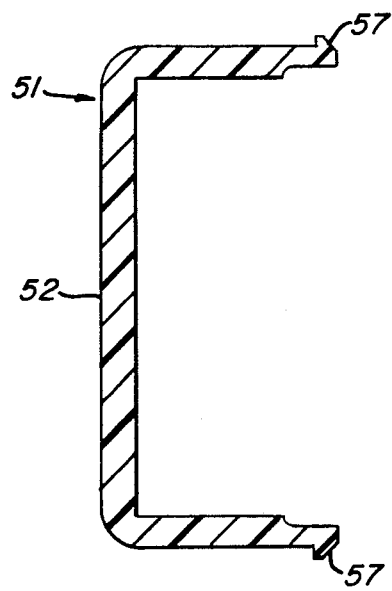
FIG. 10 is a sectional view taken on line 10—10 of FIG. 8.

The locking mechanism housing 50 is a two-part housing formed by the combination of a first housing member 51 and a second housing member 61. As shown by FIGS. 8 and 10, the first housing member 51 is formed to provide a major side wall 52 and a plurality of other walls normal to the side wall 52 and defining a cavity complementary to the shape of about half of the locking mechanism per se. The edges of the walls normal to the major side wall 52 provide an inner peripheral edge surface 54. The front and the rear end walls of the housing 52 are formed to provide axially aligned semi-circular recesses or bosses 55 and 56. A pair of apertures 58 and 59 are also provided through the side wall 52 of the housing member 51.

The inner peripheral edge 54 of the housing member 51 is interrupted at several locations by the provision of a hook or detent 57, five of which are shown formed integrally with the first housing member 51.

Figure 9:
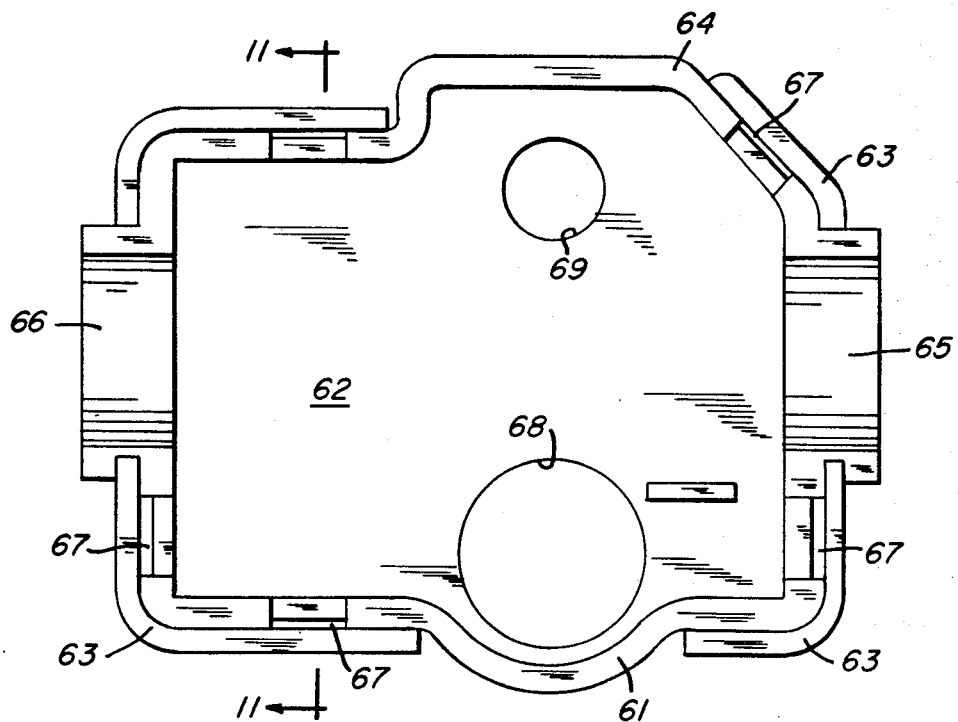
FIG. 9 is a side elevation view of the other member of the locking mechanism housing.
Figure 11:
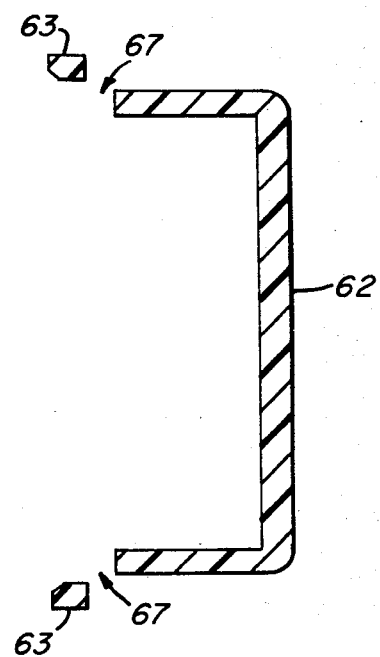
FIG. 11 is a sectional view taken on line 11—11 of FIG. 9.

As shown by FIGS. 9 and 11, the second housing member 61 is formed to provide another major side wall 62 and a plurality of other walls normal to the side wall 62 and defining a cavity complementary to the other half of the locking mechanism. The outer edges of the walls normal to the major side wall 62 define an inner peripheral edge surface 64 which is substantially a mirror image of the shape of the inner peripheral edge 54 of the first housing member 51. A pair of axially aligned semi-circular recesses or bosses 65 and 66 are provided to the inner peripheral edge 64 of the second housing member 61.

Portions of the inner peripheral edge 64 of the housing member 61 are also flanged as shown by the reference numberal 63 and a plurality of slots 67, five of which are shown, are formed at the inter section of the flanges 63 and one of the other walls normal to the side wall 62 of the housing member 61. A pair of apertures 68 and 69 are also provided through the side wall 62 of housing member 61.

The two parts 51 and 61 of the locking mechanism housing 50 are formed to be assembled to the seat adjusting device after the lockwashers, fulcrum and spring have been assembled to the rod by placing the housing members 51 and 61 on opposite sides of the rod 22 and applying a slight manual force to secure the two housing members together. The inner peripheral edges 54 and 64 are formed as mirror images one of the other so that they may be readily placed in abutment. The flanges 63 provided about portions of the inner peripheral edge 64 of housing member 61 are formed complementary to the outer surfaces of the walls of the housing member 51 to secure the housing members 51 and 61 against lateral displacement when the inner peripheral edges 54 and 64 are placed in abutment. Each of the detents 57 of the housing member 51 are located opposite one of the slots 67 of the housing member 61 and seat against a reverse surface of the opposing slot thereby securing the housing members 51 and 61 together.

The semi-circular bosses 55 and 56 of housing member 51 are axially algined with each other and with the semi-circular bosses 65, 66 of housing member 61 to surround the rod 22 and thereby permit the rod to extend through the circular apertures provided by the combination of the semi-circular bosses 55 and 65 and 56 and 66.

The aperture 58 of housing member 51 is also aligned on an axis with the aperture 68 of housing member 61 to receive the tubular fulcrum 34.

The aperture 59 of housing member 51 is also axially aligned with the aperture 69 of housing member 61 to receive and rotatably mount axially spaced rotary bearing surfaces of the cam shaft 28.

The housing members 51 and 61 are perferably formed by injection molding a thermoplastic resin and the housing members of the preferred embodiment are injection molded using a 30 per cent glass filled nylon resin marketed by Allied Chemical Corporation as Grade 8233.

The injection molded thermaplastic housing members 51 and 61 thus provide a lightweight housing for the locking mechanism which is self-securing and is slidably seated on axially spaced ends of the tubular fulcrum 34. As shown by dotted lines in FIG. 5, the locking mechanism 30 is secured to and supported by the channel shaped seat frame 12 by means of a pin slidably received through the interior of the hollow tubular fulcrum 34 and peened 7 or otherwise secured at the interior of the channel shaped seat frame 12. The forces developed interiorly of the locking mechanism 30 are thus taken at the hollow tubular steel fulcrum 34 independently of the lightweight plastic housing and the fulcrum is attached directly to the seat frame. The biasing force of the spring 40 and the releasing force of the cam 35 are concentrated directly on the hollow steel tubular fulcrum 34.

The invention may also be embodied in other specific forms within departing from the spirit or essential characteristics thereof. The foregoing description is therefore to be considered as illustrative and not restrictive the scope of the invention being defined by the appended claims.

I claim:

1. A seat adjusting device including a rod secured to one part of the seat and axially movable relative to a locking mechanism for selective locking engagement at different positions on said rod comprising:
    a fulcrum pivotally mounted on a fulcrum support and having an axis normal to the axis of said rod, a plurality of lockwashers slidably mounted to said rod with at least one washer on each side of said fulcrum,
    means biasing said washers about said fulcrum to engage said rod,
    manually actuable means for moving said lockwashers against said biasing means to release said engagement,
    a housing substantially enclosing said lockwashers, said fulcrum, said biasing means and said means for moving said lockwashers, and
    said fulcrum support extending through an opening in said housing and projecting out of said housing and fixed to another part of said seat whereby the load applied to said lockwashers and said fulcrum is transferred to said other part of said seat independently of said housing.

2. The seat adjusting device defined by claim 1 wherein said housing is supported by said fulcrum independently of said fulcrum support.

3. The seat adjusting device defined by claim 2 wherein said fulcrum is a hollow tubular member and said housing is supported by a pair of axially aligned apertures seated at each end of said hollow tubular member.

4. The seat adjusting device defined by claim 1 wherein said fulcrum is a hollow tubular member and said fulcrum support is a pin slidably received interiorly of said hollow tubular member.

5. A seat adjusting device including a rod secured to one part of the seat and axially movable internally of a locking mechanism for selective locking engagement at different positions on said rod comprising:
    a plurality of elongate lockwashers slidably mounted to said rod,
    a hollow tubular member having an axis normal to the axis of said rod and located intermediate one pair of adjacent ones of said elongate locking washers with the exterior surface of said hollow tubular member providing a fulcrum abutting one end of each of said one pair of elongate lockwashers,
    means biasing said elongate lockwashers about said fulcrum to engage said rod in a selected lock position,
    manually actuable means including a cam for moving said elongate lockwashers against said biasing means to release said locked position,
    a housing having a pair of axially aligned apertures seated on said hollow tubular member adjacent to each respective side of said one pair of elongate lockwashers, said housing enclosing said elongate lockwashers, said fulcrum, said biasing means and said cam and
    a support pin slidably received interiorly of said hollow tubular member and fixed to another part of said seat to support said locking mechanism independently of said housing.

6. The seat adjusting device defined by claim 5 wherein said housing is formed from a plastic material.

7. The seat adjusting device defined by claim 6 wherein said housing is formed from a glass filled polyamid resin.

* * * * *